O. P. Norris. Sheep Rack &c

No. 74411

PATENTED
FEB 11 1868

Inventor
O. P. Norris

Witnesses
J. H. Burridge
J. Holmes

United States Patent Office.

OMAR P. NORRIS, OF FOSTORIA, OHIO.

*Letters Patent No. 74,411, dated February 11, 1868.*

IMPROVEMENT IN COMBINED SHEEP-RACK AND SHELTER.

*The Schedule referred to in these Letters Patent and making part of the same.*

TO ALL WHOM IT MAY CONCERN:

Be it known that I, OMAR P. NORRIS, of Fostoria, in the county of Seneca, and State of Ohio, have invented certain new and useful Improvements in Sheep-Rack and Shelter combined; and I do hereby declare that the following is a full and complete description of the same, reference being had to the accompanying drawings, making a part of this specification, in which—

Figure 1:
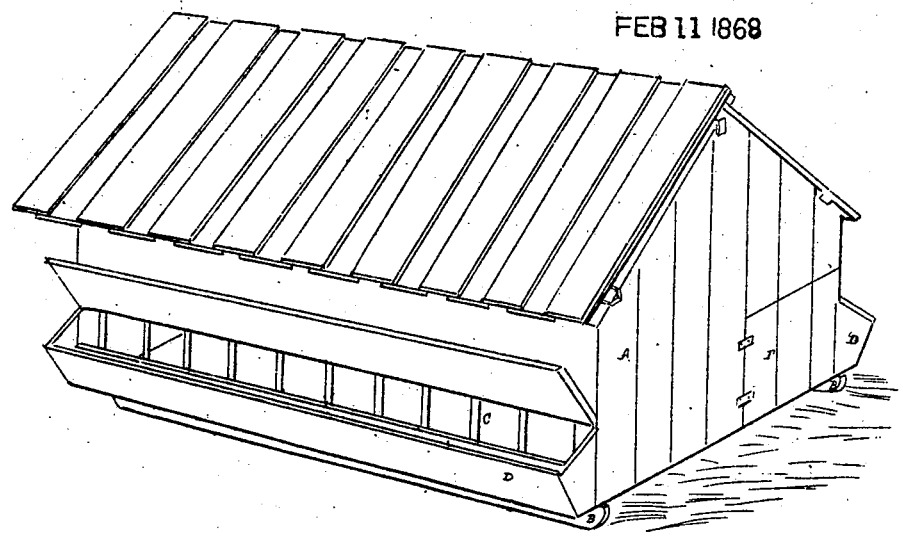
Figure 2:
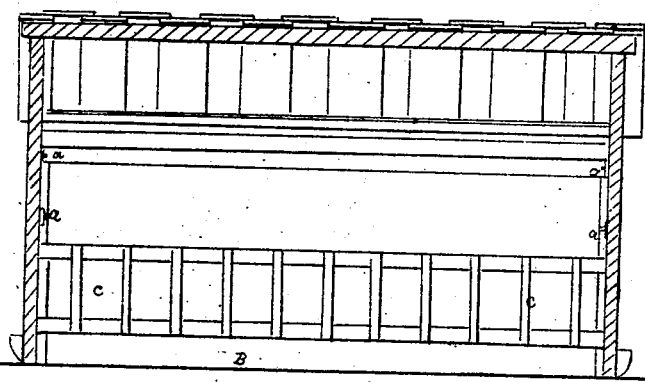
Figure 3:
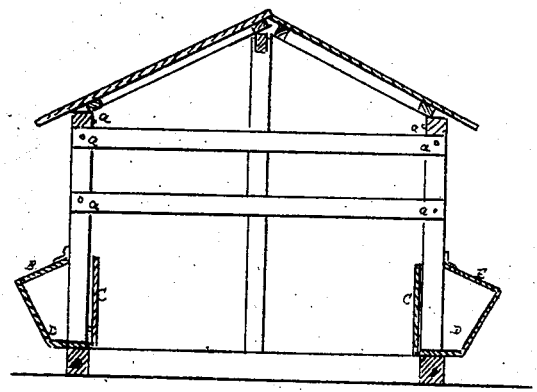

Figure 1 is a perspective view of the rack.
Figure 2 is a vertical longitudinal section.
Figure 3 is an end view.

Like letters of reference refer to like parts in the different views.

In fig. 1, A represents the shed in which the sheep are housed, and consists of a light framework of wood, constructed and put together in sections, and enclosed in the ordinary way, and of any desirable size, according to the number of the flock. B are runners, upon which the shed is mounted, for the convenience of moving the same from place to place for the purpose of feeding the sheep. C, fig. 2, are the racks, through which the sheep feed from the trough D, into which the feed is put. It will be seen that the racks are arranged along each side of the shed, and opening on the inside, whereas the troughs are on the outside of the shed, and covered by a drop-cover, E, thereby protecting the provender given the sheep from the storms of rain and snow.

By this arrangement of the racks and troughs, the animals, while feeding, are sheltered from the storms, they being allowed to enter the shed through the door F, and thereby are kept in better health and condition, by being thus comfortably housed; and, as the feed is given to them from the outside of the shed, the flock is not disturbed by the presence of those caring for them, who are not obliged to enter the shed among the sheep to put the feed in the racks or troughs, which, if the flock is large, is a matter of much trouble to pass in among them.

As above said, this house is constructed in sections, the sides, ends, and roof all being separate and distinct parts, which are framed in view of their being brought together and put up in proper position and relation to each other, and secured by the pins a. By constructing the shed in sections, as described, it can be easily taken down, and placed upon a wagon for transportation, if at any distance, or the sections may be used for other purposes, as fencing, &c., when not required for the protection of the flock.

By removing the roof, which can be easily done, as it is light and not permanently connected to the rest of the shed, the light and sunshine can be let in upon the flock, and thus, in fine weather, receive the benefit of the same without being let loose for that purpose, when required to be kept confined for the purpose of fatting, sorting, &c.

What I claim as my invention, and desire to secure by Letters Patent, is—

1. The herein-described sheep-shed, when constructed in sections, so that it may be taken apart, in the manner as and for the purpose set forth.

2. The arrangement of the racks C and troughs D, in combination with the shed A, for the purpose and in the manner substantially as set forth.

OMAR P. NORRIS.

Witnesses:
W. H. BURRIDGE.
J. A. BUDD.